Jan. 5, 1965        L. C. COTTS        3,164,715
ELECTRIC SPACE HEATING UNIT
Filed Jan. 27, 1961

INVENTOR.
LOUIS C. COTTS.
BY
Eugene C. Knoblock
ATTORNEY

United States Patent Office 3,164,715
Patented Jan. 5, 1965

3,164,715
ELECTRIC SPACE HEATING UNIT
Louis C. Cotts, 2512 Oak St., Michigan City, Ind.
Filed Jan. 27, 1961, Ser. No. 85,404
4 Claims. (Cl. 219—364)

This invention relates to improvements in electric space heating units, and more particularly to space heating units of the character illustrated and described in my co-pending application, Ser. No. 843,008, filed September 8, 1959, upon which Patent No. 3,029,332 was issued April 10, 1962.

The primary object of this invention is to provide a heating unit adapted to be installed in the duct system of a forced air circulating device to heat different zones according to the individual requirements of each zone.

A further object is to provide a heating unit of this character wherein a plurality of electric heating elements are mounted in an air circulating system supplying different zones, and wherein means are provided for automatically selecting the number of heating elements influencing the heat supplied to each zone which are operated at any given time.

A further object is to provide an electric heating device adapted to be connected to air-circulating means and having a plurality of open ended passages mounting a plurality of heating elements to influence the temperature of air supplied through ducts connected therewith to different zones or spaces, selected heating elements being connected to an operating circuit in an arrangement according to the heating capacity required in the different zones or spaces, and operation of said connected elements being regulated by temperature responsive means at said zones or spaces.

Other objects will be apparent from the following specification.

Figure 1:
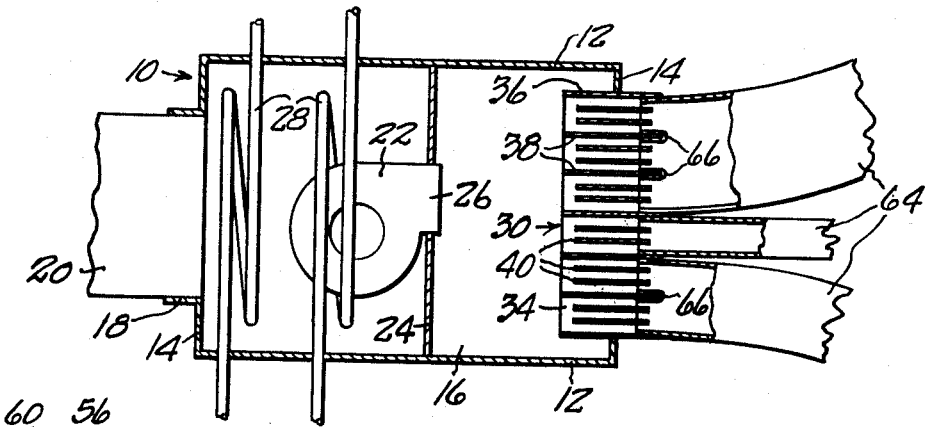
FIG. 1 is a sectional view of a device embodying my invention attached to a forced air-circulating device and adapted to control the supply of heat to a number of zones having different heating requirements.

Referring to the drawings which illustrates the preferred embodiments of the invention, and particularly to FIG. 1, the numeral 10 designates an air-circulating device having a casing with side walls 12, end walls 14, bottom walls 16, and a top wall (not shown). Each of the walls is preferably of retangular form and of selected size and dimension. Any suitable means (not shown) may be provided for supporting the casing or housing at selected position, such as means for suspendnig the same from an overhead support. The casing 10 is provided with an inlet 18 to which a duct 20 may be connected and an outlet. A fan or blower 22 may be mounted in the casing, as at an opening in a partition 24 through which its outlet 26 extends. The casing mounts air-treating means 28 which may constitute the cooling coils of an air conditioner or heating coils or burners. The casing may contain all other components necessary for functioning and control of the particular type of air-treating means 28 utilized.

Figure 2:
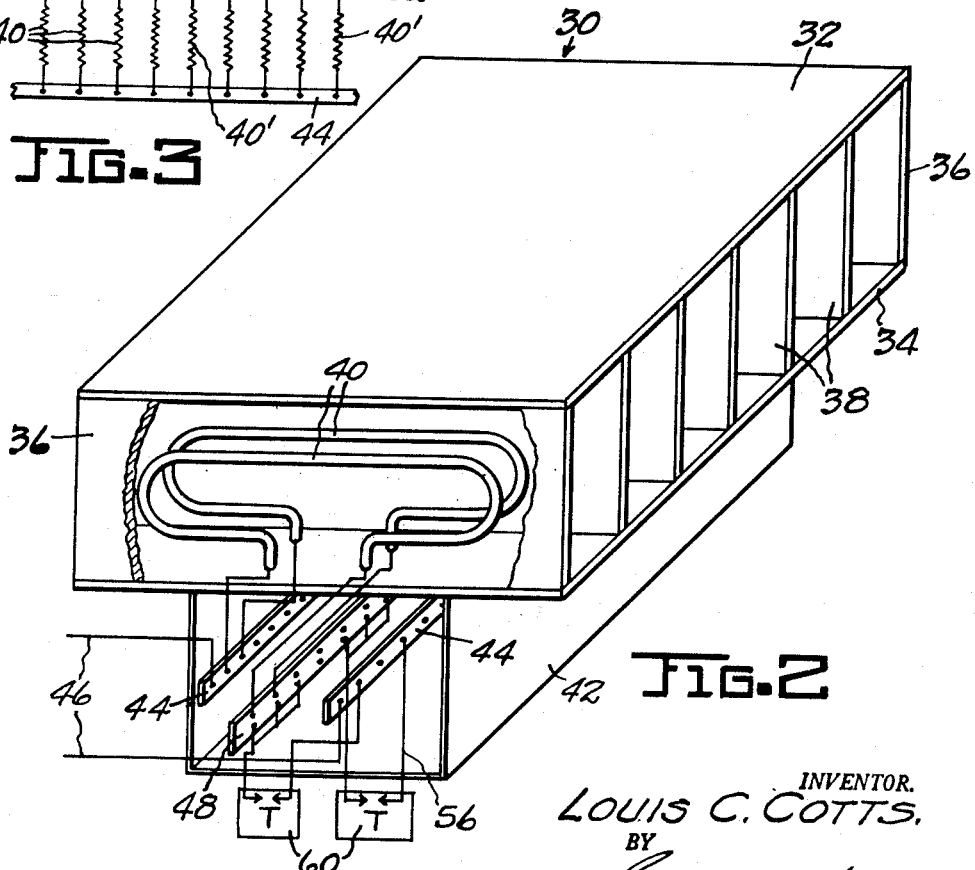
FIG. 2 is a perspective view with parts broken away, illustrating a portion of a device embodying my invention, with parts shown schematically.

My new device constitutes a unit 30 of the type shown in FIG. 2 which is mounted in and extends through an outlet opening in an end wall 14 of casing 10. The unit 30 preferably consists of a top wall 32, a bottom wall 34 and side walls 36. The unit preferably extends through the end wall 14 of casing 10 so that a portion thereof projects outwardly from said wall, as seen in FIG. 1, and a portion thereof extends into the casing 10, as seen in FIG. 1. A plurality of parallel partition plates 38 preferably divide the unit 30 into a plurality of passages, preferably of substantially the same cross-sectional area as seen in FIGS. 1 and 2. While these passages are preferably retangular and preferably of the same dimensions, they may be of selected shape and dimension. Each passage is open at both ends thereof.

Each open ended passage of the outlet unit 30 removably mounts at least one electric heating element 40 and preferably mounts two or more electric heating elements. The heating elements 40 may be Calrod units or other insulated electrical resistance members. It is not essential that the heating elements 40 be mounted physically within the passages of the outlet unit 30 but each preferably is so mounted as to heat the air which passes through a selected one of said passages. The size and shape of the electric heating elements 40 and their location shall be such as to provide desired heating efficiency of air passing through the respective passages. It will be understood that the respective passages need not be contructed of equal size and juxtaposed in a single unit as shown, but may be formed and arranged in any selected relation to one another and at any selected spacing. Likewise, it will be understood that all passages need not communicate with a single outlet in end wall 14 of casing 10 but may be arranged to communicate with outlets in a number of different walls of the casing 10.

The unit 30 will preferably have mounted on one or more walls thereof, such as the bottom wall 34, an enclosure 42 preferably having a removable closure plate (not shown). The enclosure 42 preferably extends transversely of the end walls 36 and partitions 38 and substantially full width of unit 30. The enclosure 42 houses electrical connections to the heating elements. In the form shown, the enclosure 42 receives and mounts in insulated manner one or more electrical bus bars 44 connected to the power line 46 and extending longitudinally of the enclosure 42, and a longitudinal terminal mounting member 48. Member 48 may be an insulated block or panel carrying spaced pairs of spaced terminals 50, the terminals of each pair being interconnected by electric conductors 52. One end of each heating element may be connected to a bus bar 44, and the other end of each element may be connected to a terminal 50 of member 48. Adjacent pairs of terminals 50 may be selectively connected in groups by conductors 54. One terminal of each such connected group will be connected by a lead 56 extending to the other bus bar 44 and having connected therein a thermostat 60, as illustrated schematically in FIG. 3. It will be understood that the electrical components, such as the elements 40, bus bars 44, leads 56, thermostat 60, and associated parts will be suitably electrically insulated from the casing 30. It will also be understood that the mounting of the heating elements preferably will be such as to facilitate rapid and easy disconnection of each individual heating element from the casing, and rapid and easy reconnection of a new heating element in the casing for the purpose of replacement or repair.

Hot air ducts 64 of conventional character are connected to the unit 30. The ducts 64 will preferably have one cross-sectional dimension thereof substantially equal to the spacing between the members 32 and 34 of the unit at portions thereof extending externally of the casing 10. The other transverse dimension of each duct 64 will be substantially equal to the spacing between adjacent passage separating members 38 or some multiple of that spacing. In this connection I contemplate that in one embodiment the vertical dimension of the members 36 and 38 of the unit 30 may be substantially eight inches, and that the passage separating members 38 may be spaced apart substantially two inches from each other and from the end members 26. The ducts 64 used with such embodiment will preferably have one transverse dimension of substantially eight inches or slightly less, and a second transverse dimension of two inches or some multiple of two inches. Thus a conduit having a dimension of eight inches by four inches in cross-section would serve to communicate with two of the passages in the FIG. 2 construction, and a conduit having a dimension substantially eight inches by eight inches in cross-section would communicate with four of the outlet passages shown in FIG. 2.

The ducts 64 may be connected to the unit 30 by any suitable means. Thus, in FIG. 1 is illustrated an arrangement wherein the ends of the ducts fit within the projecting portion of the unit 30 and are notched at 66 at their ends to interfit with unit 30 for communication with a multiple number of passages. It will be understood, however, that this arrangement is illustrative and that any conventional type of clip or connector, as well understood in the art or as illustrated in my co-pending application, Ser. No. 843,008, may be used if desired. It will be understood, further, that each of the ducts 64 will extend to and be connected with one or more register or outlet members located at the space to be heated and discharging thereat. Likewise it will be understood that cold air returns (not shown) from each of the spaces to be heated will be connected to communicate with the inlet conduit 20. Likewise it will be understood that each of the spaces to be heated will be supplied with a thermostat 60 connected to terminals 50 on the terminal support 48 associated with the heating elements 40 which heat air in the passages with which is connected the duct 64 which leads to the space or area in which the thermostat is located. The arrangement may apply line voltage to the thermostat, or suitable transformers and relays (not shown) may be provided to permit connection of the thermostat in a low voltage circuit, as well understood in the art. Likewise, it will be understood that the thermostat may control the associated heating elements for multiple stage operation.

In the event this heating unit is used in conjunction with or as an attachment to a primary heat source, such as a furnace of the type having a single heat source, such as a heat source 28 illustrated in FIG. 1, that heat source may be controlled by one of the zone thermostats or by an individual thermostat. In such an instance the operation of the electrical heating elements 40 may be limited to respond only to demands of each individual zone for heat exceeding that normally supplied by the primary heat source 28. It will also be understood that limit switches (not shown) may be associated with each heating element in the manner well understood in the art, to prevent overheating of any portion of the furnace or of any heating element in the event of failure of operation of the thermostatic control, failure of adequate air flow through a given duct or any other adverse occurrence.

Figure 3:
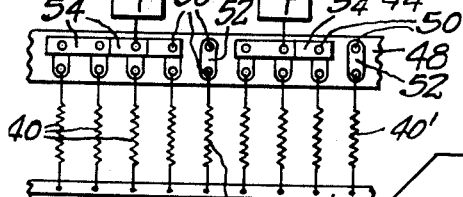
FIG. 3 is a schematic view illustrating part of an operating circuit for the device.

One of the important features of this invention is that a unit, such as shown in FIG. 2, may be assembled with a selected number of heating elements of selected capacity in each of the passages thereof. At the time of installation of the unit, the required heat output of the device for a given space to be heated may be computed. This computation may indicate that the number of heating elements installed in the unit at the various passages with which the duct 64 is connected may be excessive for the requirements of that space. In such instances, the installer may disconnect one or more of the electric heating elements located at passages communicating with the selected duct as by disconnecting that heating element across the bus bars 44. One way in which this can be done is to isolate the terminals 50 and conductors 52 on the bar 48 associated with a given heating element from the adjacent terminals 50 and conductors 52. Thus, as shown in FIG. 3, the conductors 54 between adjacent terminals 50 may be omitted at spaced points, leaving the associated heating elements 40' deenergized, as illustrated in FIG. 3. In this way, only the number of heating elements required for efficient heating operation is connected for operation and the device is prepared for such operation with minimum alteration in the field.

As an example, assume that the unit 30 is provided with twelve open ended passages therethrough and has associated therewith a blower providing total air flow at the rate of 1200 cubic feet per minute, that is, at a rate providing flow of 100 c.f.m. per passage. Assume further that two heating elements of 600 watts capacity are mounted in each passage. If such a device is to be connected to a space which requires three-quarters ton of cooling capacity or approximately 300 c.f.m. of cooled air, duct 64 leading to that space would communicate with three passages. Assume further that a computation of the maximum heat requirement of the space with which the duct 64 is connected is 3,000 watts, this heating capacity can be supplied by operating five of the six elements in those passages of the unit 30 which lead to the duct 64. Any selected one of the six heating elements can be deenergized by removing conductors 54 leading thereto so as to break the operating circuit to that element, and this operation can be done rapidly and easily at the point of installation.

While the preferred embodiment of the invention has been illustrated and described, it will be understood that changes in the construction may be made within the scope of the appended claims without departing from the spirit of the invention.

I claim:

1. An electric air heating unit adapted to be interposed in an air treating system having a housing, a forced air circulating device and a plurality of discharge ducts, comprising a structure adapted to be carried by said housing and defining a plurality of juxtaposed open ended passages each adapted to communicate at one end with said air circulating device and at its opposite end with a discharge duct, at least one electrical heating element removably mounted in each passage, electrical circuit means comprising a first elongated conductor, a second elongated conductor and an elongated non-conductor carrying a plurality of spaced terminal means thereon, carried by said structure externally of and adjacent to said passages, said first and second conductors each adapted for connection with a side of a power supply line, each heating element being electrically connected at one end to one of said first and second conductors and at the other end to an individual one of said spaced terminal means, means for electrically connecting selected ones of said spaced terminal means together in groups, means electrically connecting each of said groups of spaced terminal means to the other of said first and second conductors whereby only selected heating elements are energized when said first and second conductors are energized from said power supply line.

2. An electric air heating unit adapted to be interposed in an airtreating system having a housing, a forced air circulating device and a plurality of discharge ducts, comprising a structure adapted to be carried by said housing and defining a plurality of juxtaposed open ended passages each adapted to communicate at one end with said air circulating device and at its opposite end with a discharge duct, at least one electrical heating element removably mounted in each passage, electrical circuit means comprising a first elongated conductor, a second elongated conductor and an elongated non-conductor carrying a plurality of spaced terminal means thereon, carried by said structure externally of and adjacent to said passages, said first and second conductors each adapted for connection with a side of a power supply line, each heating element being electrically connected at one end to one of said first and second conductors and at the other end to an individual one of said spaced terminal means, means for electrically connecting selected ones of said spaced terminal means together in groups, means electrically connecting each of said groups of spaced terminal means to the other of said first and second conductors whereby only selected heating elements are energized when said first and second conductors are energized from said power supply line, the conductor means connected to each electrical heating element having a thermostat control interposed therein.

3. An electric air heating unit adapted to be interposed in an air treating system having a housing, a forced air circulating device and a plurality of discharge ducts, comprising a structure adapted to be carried by said housing and defining a plurality of juxtaposed open ended passages each adapted to communicate at one end with said air circulating device and at its opposite end with a discharge duct, at least one electrical heating element removably mounted in each passage, electrical circuit means comprising a first elongated conductor, a second elongated conductor and an elongated non-conductor carrying a plurality of spaced terminal means thereon, carried by said structure externally of and adjacent to said passages, said first and second conductors each adapted for connection with a side of a power supply line, each heating element being electrically connected at one end to one of said first and second conductors and at the other end to an individual one of said spaced terminal means, means for electrically connecting selected ones of said spaced terminal means together in groups, means electrically connecting each of said groups of spaced terminal means to the other of said first and second conductors whereby only selected heating elements are energized when said first and second conductors are energized from said power supply line, said passages extending in substantially the same direction and said electric leads extending transversely of said passages.

4. An electric air heating unit adapted to be interposed as an air treating system having a housing, a forced air circulating device and a plurality of discharge ducts, comprising a structure adapted to be carried by said housing and defining a plurality of juxtaposed open ended passages each adapted to communicate at one end with said air circulating device and at its opposite end with a discharge duct, at least one electrical heating element removably mounted in each passage, electrical circuit means comprising a first elongated conductor, a second elongated conductor and an elongated non-conductor carrying a plurality of spaced terminal means thereon, carried by said structure externally of and adjacent to said passages, said first and second conductors each adapted for connection with a side of a power supply line, each heating element being electrically connected at one end to one of said first and second conductors and at the other end to an individual one of said spaced terminal means, means for electrically connecting selected ones of said spaced terminal means together in groups, means electrically connecting each of said groups of spaced terminal means to the other of said first and second conductors whereby only selected heating elements are energized when said first and second conductors are energized from said power supply line, and an enclosure carried by said structure externally of said passages, air circulating device and ducts and encasing said electric leads and said electrical circuit means.

References Cited in the file of this patent
UNITED STATES PATENTS

| | | |
|---|---|---|
| 1,708,580 | Kerlaouezo et al. | Apr. 9, 1929 |
| 2,023,622 | Textorius et al. | Dec. 10, 1935 |
| 2,543,583 | Mattox | Feb. 27, 1951 |
| 2,712,588 | Epstein | July 5, 1955 |
| 2,839,659 | Cotts et al. | June 17, 1958 |
| 3,029,332 | Cotts | Apr. 10, 1962 |

FOREIGN PATENTS

| | | |
|---|---|---|
| 88,578 | Norway | Jan. 14, 1957 |
| 208,996 | Austria | May 10, 1960 |